Patented Dec. 30, 1941

2,267,999

UNITED STATES PATENT OFFICE 2,267,999

MAGNETIC TESTING

Robert C. Switzer, Cleveland, Ohio

No Drawing. Application March 20, 1939,
Serial No. 263,097

14 Claims. (Cl. 175—183)

This invention relates to improved magnetic particles for use in examining metallic bodies for defects.

In the practice of the magnetic particle method of detecting defects in paramagnetic bodies, the objects under examination are normally magnetized, covered with finely divided magnetic particles, and then inspected after unattracted particles have been removed from the body surfaces. Particles are retained in adherence to the surfaces in the proximity of discontinuities because of attraction by magnetic flux leakage at such points; the positions of particles are revealed and the location of defects thus indicated by the visible contrast between the body surfaces and the retained particles. As is well-known in the art, certain non-magnetic bodies are also examined for defects by somewhat varied procedures likewise utilizing magnetic particles in finely divided form. For simplicity, the term "test field" will be used hereinafter to designate the surfaces of a metallic body under examination, and the term "indicating field" will be used to designate the surfaces of magnetic particles applied to indicate the positions of defects on a test field.

The "visibility" or ease of seeing an indicating field on a test field has long been recognized as a factor of major importance in determining the sensitivity and rapidity of magnetic particle testing techniques. Poor visibility of indicating fields under the particular conditions of inspection maintained heretofore has rendered the known testing procedures somewhat tedious, time-consuming and ofttimes lacking in accuracy; and further, has noticeably limited the adoption of said techniques by industry.

The difference in the degree of brilliancy between an indicating field and a test field under the conditions of illumination maintained during inspection, governs, in large measure, the visibility or ease of seeing the indicating field. I choose to employ the term "brightness" as an indication of the degree of brilliancy of a field when it is viewed from a given direction under a given condition of illumination; since the degree of brilliancy is obviously governed by the volume of visible light, or visible light flux, directed to the eye of an observer by the surfaces under consideration, "brightness" may be measured accurately and expressed in terms of the visible light flux reflected or emitted per unit area of surface.

In the prior art, numerous attempts have been made to increase the visibility of an indicating field on a test field by increasing the difference in the brightnesses of the two fields. Thus, the low visibility of an indicating field of iron dust on a test field of iron has been increased: (a), by painting the test field a light color to increase its brightness, and then applying the iron dust; and (b), by coating the iron dust with a light-colored substance to increase its brightness, and then applying the treated particles to the untreated test field of iron. Likewise, substitution of the black magnetic oxide of iron in the place of pure iron dust as an indicating field for use over a test field of bright metal has resulted in an increase in visibility, for the brightness of the iron oxide is less than that of the pure iron dust under the same conditions of illumination. Illumination during inspection has been provided in the prior art by incandescent lamps, electric discharge lamps, daylight or combinations of same; in some cases particular attention has been given to increasing the visibility of the indicating field in use by altering the angle of incidence of the impinging light rays so that more light is reflected to the eye of the observer by the surfaces of the indicating field, thereby increasing the brightness of that field, or so that less light is reflected to the eye by test field surfaces, thereby decreasing the brightness of said test field.

It is among the objects of this invention: to provide improved magnetic particles and inspection conditions which will increase the sensitivity of magnetic particle testing methods; to provide improved magnetic particles and inspection conditions which will increase the speed of magnetic testing by elimination of certain doubtful indications heretofore encountered; to provide improved magnetic particles of high visibility and which are readily detectable under controlled inspection conditions; to provide improved magnetic particles which are detectable under controlled inspection conditions even though they are of such minute size and mass as to be imperceptible to the human eye in incandescent light; and, to produce improved magnetic particles. Other objects and purposes of the invention will become apparent to those versed in the art by a reading of the following desription and appended claims.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

I have found that defects in metallic bodies are detectable with remarkable speed and accuracy when the brightness of one of the two fields is decreased to a point approaching zero brightness while the brightness of the other field remains readily measurable. However, a brightness approaching zero in one of the two fields under consideration is attainable only if inspection is carried out in the substantial absence of visible radiations, i. e., in darkness or near-darkness; obviously, elimination of visible radiations from the viewing condition customarily maintained during inspection of the field combinations used heretofore, decreases the brightnesses of both fields to the extent that neither field retains measurable brightness. I have overcome the difficulty of maintaining one field at a readily measurable brightness while maintaining the other field at a brightness approaching zero by causing the field required to exhibit measurable brightness to emit visible radiations during inspection in near-darkness.

In practice, I may provide a test field capable of emitting visible light in darkness and employ a dark-colored indicating field, as the black magnetic oxide of iron. During inspection in darkness, those particles which are lined up at discontinuities appear as a series of black specks on a transparent surface illuminated from behind. Preferably, I provide a light-emissive indicating field over a test field of untreated metal, in which instance each tiny magnetic particle adhering to the body will throw out distinct beams of visible light that cannot be missed during inspection in darkness, while a line of magnetic particles retained in adherence in the proximity of a crack, for example, will have the appearance of a tiny electric discharge tube burning against a black background. Either procedure provides indicating fields which are remarkably easy to see, for the light-emissive field becomes an actual source of visible light, thereby exhibiting high brightness, while the brightness of the non-luminescent field becomes virtually negligible.

The light-emissive field may be coated, for example, with phosphorescent substances to which have been added radio-active salts capable of spontaneously activating the phosphorescent substances to visible light emission. As an alternative, the light-emissive field may be coated with a phosphorescent substance alone, in which case inspection in darkness is preceded by an activation period. A preferred embodiment of the invention, however, comprises the provision of a fluorescent indicating field capable of emitting visible radiations in near-darkness during activation by fluorescigenous radiant energy substantially invisible to the human eye. In treating magnetic particles for this purpose, I generally employ fluorescent substances of the class characterized by ability to emit visible colored light during exposure to fluorescigenous radiant energy shorter in wave-length than visible light, and, by so doing, am enabled to activate the fluorescent field during final inspection with fluorescigenous radiant energy that does not materially alter the preferred viewing condition of virtual darkness. By increasing the intensity of the invisible activating radiations impinging upon the fluorescent field, it is possible to increase the visibility of said field to almost any practical degree, for the fluorescence brightness of said field may thus be increased in large degree by an increase in the intensity of activating radiations without any material increase in the brightness of the non-fluorescent field.

For the purpose of activating fluorescent magnetic particles retained in adherence to a body under test, I generally employ substantially invisible fluorescigenous radiant energy, as X-rays, cathode rays, short-wave ultra-violet or long-wave ultra-violet. On occasion, though, it has been found advantageous to employ certain fluorescigenous visible radiations, as monochromatic blue light, to activate fields treated with fluorescent substances capable of transforming such radiations into green, yellow or red light, for example. In such instances, the brightness of the non-fluorescent field may be considerably greater than zero brightness, but nevertheless low enough to effect a material increase in visibility over combinations employed in the prior art. Perhaps the most practical range of radiations for activating photo-luminescent fields, however, is to be found in the long-wave or "near" ultra-violet region, as such radiations are inexpensive to produce, easily reflected and projected, and quite harmless. Photo-luminescent substances which fluoresce during exposure to such radiations are likewise numerous, relatively inexpensive to produce and include many having high fluorescence "concentration."

The magnetic particles as heretofore employed in testing procedures are totally lacking in natural fluorescence properties, but may be rendered fluorescent in several ways. It is normally advantageous to treat magnetic particles with substances capable of fluorescing in a solid or crystalline form or when in combination with other substances in a solid state. Although the particles may be treated so as to fluoresce in almost any desired color, particles fluorescing greenish-yellow are usually preferred, doubtlessly because of the keen sensitivity of the normal eye to light of this color and the consequent ease with which particles so fluorescing may be seen under the proper conditions of inspection. Thus, for purposes of illustration only and not by way of limitation, the following methods of preparing photo-luminescent magnetic particles are confined to treatments intended to render particles capable of fluorescing whitish-green to yellow-green when in a solidified state and during exposure to "near" ultra-violet light:

*Example 1.*—The inexpensive technical grades of anthracene, the substance of the formula

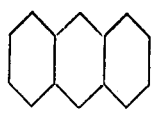

are useful for the fluorescence treatment of magnetic particles. Thus, finely-divided particles of a paramagnetic material, as iron, are rendered fluorescent when dipped in a hot, super-saturated solution of the above substance in carbontetrachloride, for example. A convenient procedure for treatment comprises pouring the magnetic particles into a vat of the hot solution, agitating briefly, allowing the particles to settle, decanting, and drying the particles at a moderate temperature.

Alternatively, super-saturated solutions of 2-aceto-1-naphthol and/or 1,2,5,6-dibenzanthracene, exemplary fluorescent crystals of the following structural formulae, may be employed as dips for magnetic particles:

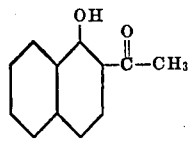

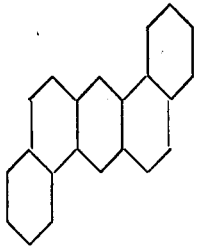

Moderate percentages of a transparent binder or adhesive may ofttimes be added advantageously to the dipping solutions described as an aid in causing the recrystallized fluorescent particles to adhere more permanently to the surfaces of magnetic particles. Thus, substantial proportions of a solution of low-viscosity ethyl cellulose in xylene and alcohol added to the carbon-tetrachloride solution first described will cause the fine fluorescent crystals to adhere permanently without material lowering of their fluorescence brightness.

*Example 2.*—Paramagnetic particles exhibit good fluorescence brightnesses following treatment in certain fluids which comprise normally solid meltable fluorescent substances in a molten state. One satisfactory procedure for treatment by this method consists in placing the meltable fluorescent substance chosen and the finely divided paramagnetic particles to be treated in an autoclave equipped with stirring device, raising the temperature to a degree sufficient to melt the fluorescent substance, stirring the mixture to effect wetting of the particle surfaces by the molten substance, discharging, cooling, and finally grinding the resultant mass. It is sometimes found advantageous to include a small proportion of a meltable transparent resin or adhesive to aid in causing the fluorescent substance to adhere permanently to the paramagnetic particles.

Relative proportions of paramagnetic particles, meltable fluorescent substance and meltable resin, when included, may be varied throughout an extremely wide range; as a specific example, however, it is noted that four volumes (dry measure) of finely divided paramagnetic particles, one volume of powdered low-viscosity ethyl cellulose and five volumes of the technical grades, (70% to 85%), of anthracene may be utilized successfully in the procedure last described. Particles of fluorescent crystals and/or resin not attached to paramagnetic particles may be readily removed from the dry ground product, if desired, by well-known magnetic separation means. Other normally solid fluorescent substances which may be utilized in the above procedure include 1,2,5,6-dibenzanthracene and fluorenone, compounds having the following structural formulae:

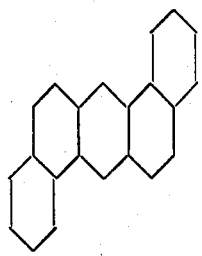

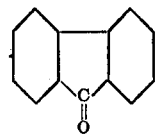

*Example 3.*—A highly satisfactory method of rendering paramagnetic particles fluorescent comprises the virtual "lacquering" or "painting" of the particles with fluorescent compositions, which usually consist of a transparent resinous solution, fluorescent pigment and, on occasion, a moderate percentage of a white pigment, as lithopone, having good opacity and a high reflection factor for the visible light emitted by the fluorescent pigment during activation. Thus, to a mixture consisting, for example, of three volumes of finely divided paramagnetic particles and two volumes of one of the dry fluorescent pigments corresponding to the structural formulae:

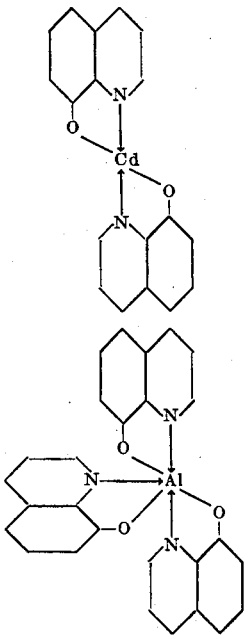

is added a rapid drying water-clear lacquer in a volume sufficient to just wet the dry particles during a thorough grinding operation. The heavy paste is continuously ground in an open mill or mixed in an open mixer until solvent evaporation is substantially completed; the lumpy product is subsequently broken up and dried in a pigment drier. If the treated particles are to be utilized by dusting methods, a thorough dry grind is then necessary. If it is desired to prepare an immersion bath into which metallic bodies are dipped prior to examination, the treated particles are advantageously ground into a suitable fluid carrier; a satisfactory immersion bath is provided by grinding five or ten per-cent of the above-described "lacquered" particles into a light mineral oil, for example. Alternatively, if it be necessary to prepare a paste of fluorescent paramagnetic particles, from which an immersion bath may be made in a manner well-known in the art by subsequent dilution prior to using, a higher percentage of the treated particles, as forty per-cent, are ground into the light oil.

In the structural formulae given in Example 3 above, the arrows are intended to represent coordinate valence bonds or semi-polar linkages. The two fluorescent pigments represented, and others which are useful in preparing fluorescent paramagnetic particles, are disclosed and jointly claimed in co-pending application Serial No. 259,412 filed on March 2, 1939; by the present applicant, Joseph L. Switzer, and Richard A. Ward. The di-valent metal pigment above illustrated by structural formula may be further identified as the inner cadmium complex of 8-hydroxyquinoline, the tri-valent metal pigment as the inner aluminum complex of 8-hydroxyquinoline.

The above procedures, with slight modifications, are generally applicable to the treatment of any useful paramagnetic particles, which may include the magnetic iron oxides, the paramagnetic aluminum alloys, or the powdered forms of the ferromagnetic metals, i. e., iron, nickel and cobalt. Prior to the fluorescence treatment of some particles, however, I may advantageously coat them with white paint or the like to increase their light reflection factors so that more of the visible radiations emitted by the fluorescent substances with which they are treated will be reflected to the eyes of inspectors.

Metallic bodies to be examined for defects by fluorescent particle testing procedures are prepared for inspection by methods well-known and long practiced in the art of magnetic particle testing today, as by exposure to the action of a magnetic field or by placement in an electrical circuit. Fluorescent magnetic particles are then satisfactorily applied to the prepared body under examination by a wide plurality of procedures, including modifications of the well-known "dry" and "wet" methods. Thus, dry fluorescent magnetic particles are dusted, sprayed or otherwise applied to the body in a magnetized state, unattracted particles then being removed by suction, air blast, vibration of the body, etc. Alternatively, fluorescent magnetic particles are dispersed in a fluid vehicle, usually of an oily nature; the work in a magnetized condition is immersed in the resultant dispersion, or sprayed with same; and subsequently, the test body is washed in a solvent, as gasoline, which removes the unattracted particles and most of the vehicle, leaving only the attracted particles lined up in the proximity of defects. In a manner broadly similar to that employed in the prior art, pastes of fluorescent magnetic particles, exemplified in Example 3 above, are cut down with sufficient light oil or other solvent, (as 10 to 20 volumes) to provide an immersion bath of proper dipping consistency.

Care should be taken in choosing the particular fluid to be used as a carrier of any given type of fluorescent magnetic particle. Fluid carriers of fluorescent magnetic particles must obviously have the proper lubricating, flowing and insulating characteristics required in carriers of particles of the prior art: in addition, carriers of the particles of this invention must not dissolve or otherwise remove the fluorescent ingredients in or on the magnetic particles; the fluids must not destroy the fluorescence properties of said prepared particles, (as by oxidation or reduction processes); the vehicles should be substantially non-fluorescent under the activating radiations utilized during inspection so as to leave no disturbing fluorescent stains on the non-flourescent test field; etc. In general, oils and solvents vary widely in degree of natural fluorescence, as under ultra-violet light, for example; although thin films over metal of most normal carriers of magnetic particles are found to be of relatively low fluorescence brightness in comparison to the high fluorescence brightnesses of most of the fluorescent magnetic particles of this invention, best results are assured in any given case by the choice of a medium chemically indifferent to the fluorescent materials employed and of minimum fluorescence brightness. Many selected solvents, as carbon-tetrachloride, some kerosenes and naphthas, and some water-clear mineral oils are of relatively low fluorescence brightness and are therefore advantageously utilized as carriers of fluorescent magnetic particles treated with fluorescent materials for which the said fluids are non-solvents.

Although photo-luminescent magnetic particles may obviously be applied to the test field under normal conditions of illumination, even coverage of the entire field under test is assured if fluorescent particles are applied under the actual conditions of inspection, i. e., in the substantial absence of non-fluorescigenous visible radiations and during radiation of the fields with fluorescigenous radiant energy. This technique is particularly recommended in the dusting of large fields requiring local magnetization or localized application of the indicating field; here it is found advantageous to mark or otherwise map the work so that all parts of the field will be inspected, and for this purpose, as well as for marking the locations of defects as they are found, I employ a chalk or crayon compounded so as to leave a mark, visible in daylight, which fluoresces distinctively in a color differing materially from the fluorescence of the indicating field utilized. A satisfactory chalk for use with indicating fields fluorescing green may be made, for example, by kneading a mixture consisting of 2 parts by weight of lithopone, 1 part of a glue solution and 20 parts of phenanthrene, a substance of the structural formula

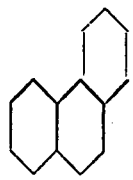

and subsequently pressing the mix in molds. Marks made with this chalk will fluoresce a vivid whitish-blue during exposure to near ultra-violet light.

As mentioned heretofore, ultra-violet light comprises the most practical fluorescigenous radiant energy for use at the present time in radiating inspection departments wherein fluorescent fields are utilized in magnetic particle testing. Most sources of long-wave ultra-violet light, including the sun, the carbon arc, the mercury arc, the argon-nitrogen glow discharge, the incandescent filament of lamps burned over-voltage, etc., likewise produce visible radiations which are largely undesirable for the purposes of this invention and are therefore customarily eliminated. To accomplish this purpose, the radiations from the source utilized are passed through filters of glass or other transparent media colored in accordance with known practices in the lighting industry to absorb the visible radiations and to pass the invisible long-wave ultra-violet radiations; under some circumstances, filters may be used which absorb most of the visible light but pass, in addition to the near ultra-violet radiations, a small percentage of purple or other visible light sufficient to illuminate non-luminescent objects in the inspection room to the extent that they may be distinguished readily by inspectors. Although the introduction of such visible radiations incident to the fields during inspection will result in particle visibilities below maximum, it has been found that the principles of the invention may be employed to increase visibilities considerably above the levels of those attained in the systems heretofore in use even though inspection be carried out in well-lighted inspection rooms. Portable hoods of black canvas or the like are useful in darkening localized areas under test in cases where it is necessary that strong visible light be present continuously in the inspection rooms. As a means of increasing particle visibility in cases, for example, where some visible light is directed upon the fields by the ultra-violet source in use, I make use of visual filters constructed to pass the visible light emitted by the fluorescent field and to absorb a maximum percentage of the activating and other radiations reflected from non-fluorescent surfaces during inspection. Thus, the orthodox photographic "haze" filter of gelatine, worn in the form of glasses by an inspector, increases particle visibility materially in a case, for example, wherein the photo-luminescent field is fluorescing greenish-yellow and the incident radiations consist of ultra-violet and some visible purple and blue light, for the filter absorbs the radiations reflected by the non-fluorescent field, thereby materially decreasing the brightness of that field, while allowing substantially all of the visible light emitted by the fluorescent field to pass. Furthermore, absorption by such a filter of reflected ultra-violet radiations ofttimes adds to the comfort of inspectors, for the natural fluorescence of the human eye in ultra-violet light otherwise creates a haze that is disturbing to some.

High-intensity mercury vapor tubes enclosed in tubular ultra-violet filters are excellent practical sources of ultra-violet light. They may be installed advantageously in permanent fixtures in inspection departments or carried conveniently by inspectors in portable units designed for radiation of localized areas, a procedure of advantage, for example, in cases where large test bodies are to be inspected. As defects are located in ultra-violet light, inspectors often desire to examine them momentarily under normal conditions of illumination, and for this purpose it has been found advantageous to provide inspectors with a portable combination unit in which a high-intensity mercury vapor tube equipped with filter and an ordinary incandescent lamp are operated in a wide, bowl-shaped reflector containing two receptacles, means likewise being provided for switching the lamps on and off at will.

Although many metal bodies adaptable to be examined by fluorescence magnetic testing methods have relatively high light-reflection factors, they are devoid of fluoresence properties generally and thus appear a velvety black or purple during exposure to ultra-violet light in the absence of visible radiations. Vividly fluorescing particles, adhering in the proximity of defects on such dark grounds and throwing off distinct beams of visible colored light to the eyes of inspectors, cannot escape detection. Thus, test fields may now be scanned very rapidly during inspection, for the eyes of inspectors are drawn automatically to the loci of particles fluorescing against the dark ground, much in the same manner that the eyes of passers-by are drawn to a glowing "neon" sign on an otherwise darkened city street. Needless to say, the complete darkening of the test field during inspection has eliminated many of the errors made heretofore in orthodox magnetic particle testing techniques because of the high degree of light-reflection by the metal surfaces under test and the consequent visual difficulties encountered in minutely examining said surfaces under strong lights.

The photo-luminescent magnetic particles of this invention, ofttimes sub-divided to particle sizes well below 5 microns, have the further advantage of being easily detectable over metal grounds under ultra-violet light even though they are of such tiny mass and size as to be indetectable to the human eye in incandescent light and as to therefore escape detection completely by orthodox inspection methods. The extremely weak magnetic flux leakage at incipient and other minute discontinuities is often capable of causing only the finest of particles to adhere in resistance to a light air blast or other force employed to remove excess particles; since the particles of the invention throw out distinct beams of visible light in comparative darkness, and thereby become highly visible and readily detectable, their usage effects considerable increases in the sensitivity of magnetic particle testing procedures. Thus, defects of microscopic dimension are now often positively indicated by groupings of minute particles which fluoresce distinctly under the conditions of inspection but which cannot be seen in incandescent light, or at best serve merely as a very doubtful indication of the presence of a defect under the latter condition. Similarly, inspectors now find minute fluorescent particles retained in adherence along the line of a discontinuity beyond its expected limits or its limits as determined by other methods. It is to be noted that the elimination by the invention of many doubtful indications encountered in particle testing procedures heretofore has increased the speed with which particle testing may be carried out, for now the presence or absence of minute particles in the area under inspection is quickly indicated with accuracy.

The photo-luminescent particles of this invention have the further advantage in that metallic bodies tested by utilization of same may be "scanned" automatically. The visible light rays emitted by the particles in virtual darkness are readily detected by sensitive photoelectric cells, which may be used with a series of relays to operate visible or audible signals or devices for rejecting the defective bodies. Similarly, the said visible light rays are readily recordable by photography; photographs of excellent contrast are easily produced which record the arrangement, location and approximate mass of particles retained in adherence at a defect with remarkable detail and clarity.

Although the invention has been described with a certain degree of particularity, it is to be understood that the present disclosure has been made only by way of example, and that numerous substitutions and changes in photo-luminescent materials employed, particles treated and procedures of treatment utilized may be resorted to without departing from the spirit and scope of the invention as hereinafter claimed.

I claim:

1. The improved process of preparing paramagnetic particles for use in the examination of metallic bodies for defects, which comprises impregnating and coating finely divided paramagnetic particles with a fluorescent substance.

2. The improved process of preparing paramagnetic particles for use in detecting defects in metallic bodies, which comprises coating finely divided paramagnetic particles with a molten substance capable of emitting visible light during exposure to substantially invisible fluorescigenous radiant energy.

3. The improved process of preparing paramagnetic particles for use in the examination of metallic bodies for defects, which comprises coating finely divided paramagnetic particles with a normally solid fluorescent substance and dispersing the coated particles in a fluid medium.

4. In the production of paramagnetic particles, the step which comprises coating finely divided paramagnetic particles with a normally solid fluorescent substance and a transparent binding medium.

5. The method of testing metallic articles for flaws comprising the steps of creating a magnetic flux in the portion of the article comprising the test field, applying finely divided fluorescent particles having paramagnetic characteristics to the test field, subjecting the test field to fluorescigenous radiations and noting the location of the particles adhered to the article under the influence of the magnetic flux and fluorescing under the influence of the fluorescigenous radiations.

6. In the method of testing a metallic object for flaws in which a surface of the metallic article comprises a test field and paramagnetic particles comprise an indicating field, the steps of rendering one of the fields fluorescent, creating a magnetic flux in the test field, placing the paramagnetic particles on the test field, subjecting the fields to fluorescigenous radiations and noting the brightness contrast between the test field and the indicating field.

7. The method of testing metallic articles for flaws comprising the steps of creating a magnetic flux in the portion of the article comprising the test field, applying finely divided fluorescent particles having paramagnetic characteristics to the test field, subjecting the test field to fluorescigenous radiations in the substantial absence of visible light so that the contrast between the visible light emitted by the particles and the visible light reflected by the test field denotes the location of flaws in the article by means of the particles adhered to the article under the influence of the magnetic flux and fluorescing under the influence of the fluorescigenous radiations.

8. The method defined in claim 5 including the step of marking the location of the adhered and fluorescing particles.

9. The method defined in claim 7 including the step of marking the location of the adhered and fluorescing particles with an instrument leaving a fluorescent mark upon the test field.

10. As a composition of matter, paramagnetic fluorescent particles for detecting flaws in metallic bodies comprising finely divided paramagnetic particles and a fluorescent substance adhered to the surfaces of said paramagnetic particles.

11. A composition of matter for detecting flaws in metallic bodies comprising a substantially non-fluorescent fluid, finely divided paramagnetic particles dispersed in said fluid, and a fluorescent substance adhered to the surfaces of said paramagnetic particles.

12. As a composition of matter, paramagnetic fluorescent particles for detecting flaws in metallic bodies comprising finely divided paramagnetic particles, a transparent binder coated on said paramagnetic particles, and a fluorescent substance carried by said binder.

13. As a composition of matter, paramagnetic fluorescent particles for detecting flaws in metallic bodies comprising finely divided paramagnetic particles, a visible light reflecting pigment and a fluorescent substance adhered to said paramagnetic particles.

14. The process as defined in claim 1 including the step of coating the paramagnetic particles with visible light reflecting pigment.

ROBERT C. SWITZER.